Jan. 11, 1949.　　　J. A. C. MALCHUS　　　2,458,614
DUST ASPIRATOR WITH A ROTATABLE
FLEXIBLE TUBE CONNECTION
Filed Aug. 21, 1946
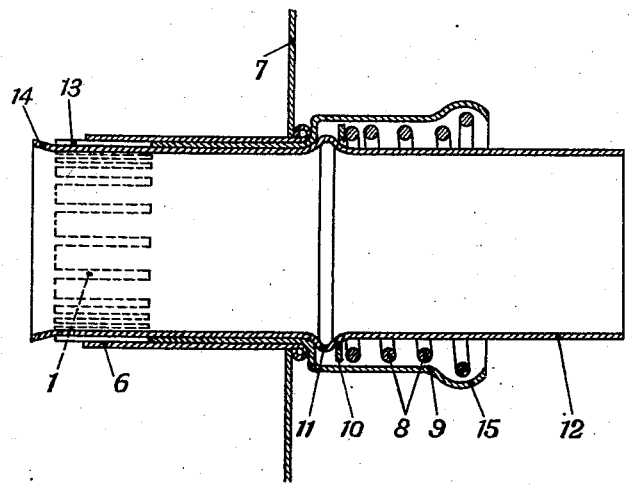
Inventor:
Johannes Andries Christiaan Malchus Patented Jan. 11, 1949

2,458,614

UNITED STATES PATENT OFFICE 2,458,614

DUST ASPIRATOR WITH A ROTATABLE FLEXIBLE TUBE CONNECTION

Johannes Andries Christiaan Malchus, Amsterdam, Netherlands

Application August 21, 1946, Serial No. 692,079
In the Netherlands July 7, 1942

Section 1, Public Law 690, August 8, 1946
Patent expires July 7, 1962

6 Claims. (Cl. 285—25)

The invention relates to a dust aspirator with a rotatable flexible tube connection consisting of two in length direction to each other slidable sleeves mounted the one in the other, wherein the flexible tube is fixed in the inner sleeve. Said sleeve being provided at its inner end with a conical shaped part and the outer sleeve can be clamped in a mouthpiece of the dust aspirator casing as the outer sleeve being provided with sawcuts of the like forming tongues, and these tongues are pressed outward by the conical shape end of the inner sleeve, when the inner sleeve is moved under the tongues, which clamping is released by pressing the inner sleeve away from the elastic tongues, and a screw spring is provided maintaining both sleeves with respect to each other in the one outer position, as described in the Dutch Patent No. 52,021.

The mouthpiece in this construction is provided with a rotatable part, so that this element is very complicated and expensive and moreover both sleeves are maintained in the clamping position by the screw spring, with the disadvantage that for unlocking the sleeves the back pressure of the spring must be overcome, and the sleeves must be maintained in this unlocked position in order to be able to push the connection in the mouthpiece or to remove said connection from this mouthpiece. For this manipulation both hands are wanted.

This disadvantage is avoided by the invention and a simple and effective construction is obtained, because the screw spring presses the inner sleeve inwardly with respect to the outer sleeve in such a manner that the clamping action of the outer sleeve is normally released and the clamping action against the action of the spring is accomplished by pulling the flexible tube.

The invention will now be described by way of example with reference to the accompanying drawing, showing a longitudinal section through the axis of the connection.

An inner sleeve 12, in which the flexible tube (not shown) is fixed, is in the length direction slidable and easily rotatable mounted in an outer sleeve 9, 13, of which the part 9 has a larger diameter than the part 13. In this part 9 a strong screw spring 8 is mounted, one end of which bears in a hollow edge 15 of the outer sleeve 9 and with the other end upon a ring 10, bearing against a bent edge 11 of the inner sleeve 12, transferring the tension of the spring to the inner sleeve 12. The other end of the sleeve 12 is formed to a funnel 14, in the one side preventing the sleeve 12 to leave the sleeve 9, 13 and on the other side to perform a function to be indicated further on. The largest diameter of this funnel 14 is smaller than the inner diameter of the mouthpiece 6 fixed in the lid 7 of the dust aspirator, but bigger than the inner diameter of the part 13 of the sleeve 9, 13.

The inner end of the part 13 of the outer sleeve 9, 13 is provided with sawcuts forming elastic tongues, so that when the sleeve is pulled outwardly the sleeve 12 with respect to the sleeve 9, 13 the tongues of this part 13 are pressed outwardly against the sleeve 6, so that the sleeve 9, 13 is clamped firmly in the sleeve 6. The spring 8 is then impressed and put under tension. If the sleeve 12 is released, then the spring 8 moves the sleeve 12 inwardly and the sleeve is rotatable again in the sleeve 9, 13. If it is wanted to draw the flexible tube out of the mouthpiece, only the outer sleeve 9 must be held with one hand and the connection is adapted to be removed easily out of the mouthpiece, because the funnel 14 is free from the tongues and the same can now spring back inwardly. Because the spring 8 is released normally, when the flexible tube is not pulled, the tube connection can easily be pushed into the mouthpiece.

What I claim is:

1. Attaching device comprising in combination an inner sleeve member; stop means provided on said inner sleeve member intermediate the ends thereof so as to form two inner sleeve portions divided from each other by said stop means; outwardly bent holding means at the free end of one of said inner sleeve portions of said inner sleeve member; an outer sleeve member composed of two outer sleeve portions one of which closely surrounds that inner sleeve portion the end of which is bent outwardly, and the other of which surrounds the other inner sleeve portion spaced from the same; and spring means within said space formed between said other inner sleeve portion and other outersleeve portion abutting at one end against said stop means provided on said inner sleeve member and at the other end against said other outer sleeve portion tending to move said outer and inner sleeve relative to each other.

2. Attaching device comprising in combination an inner sleeve member; stop means provided on said inner sleeve member intermediate the ends thereof so as to form two inner sleeve portions divided from each other by said stop means; outwardly bent holding means at the free end of one of said inner sleeve portions of said inner sleeve member; an outer sleeve member composed of two outer sleeve portions one of which closely surrounds the other sleeve portion spaced from the same; outwardly bendable resilient means arranged at the free end of that outer sleeve portion which closely surrounds said inner sleeve member and adapted to be bent outward by said outwardly bent holding means when said inner sleeve member is pulled into said outer sleeve member; and spring means within said space formed between said other inner sleeve portion and said other outer sleeve portion tending to slide said sleeve members relative to each other.

3. Attaching device for holding a tubular arrangement within an opening comprising in combination an outer sleeve member closely fitting into said opening; stop means at the outer end of said outer sleeve member preventing sliding of the same through said opening in inward direction; outwardly bendable stop means at the inner end of said outer sleeve member preventing when in outwardly bent position sliding of said outer sleeve member through said opening in outward direction; an inner sleeve member closely fitting into said outer sleeve member and arranged within the same projecting at both ends beyond said outer sleeve member; outwardly bent stop means on the inner projecting end portion of said inner sleeve member preventing sliding of the same through said outer sleeve member in outward direction and adapted to outwardly bend said outwardly bendable stop means at the inner end of said outer sleeve member when said inner sleeve member is pulled in outward direction; stop means arranged on the outer projecting end portion of said inner sleeve member preventing sliding of the same through said outer sleeve member in inward direction; and spring means mounted between said outer sleeve member and said inner sleeve member tending to slide said inner sleeve member within said outer sleeve member in inward direction.

4. Attaching device for holding a tubular arrangement within an opening comprising in combination an outer sleeve member closely fitting into said opening; stop means at the outer end of said outer sleeve member preventing sliding of the same through said opening in inward direction; outwardly bendable stop means at the inner end of said outer sleeve member preventing when in outwardly bent position sliding of said outer sleeve member through said opening in outward direction; an inner sleeve member closely fitting into said outer sleeve member and arranged within the same projecting at both ends beyond said outer sleeve member so as to form an inner projecting end portion and an outer projecting end portion; outwardly bent stop means on said inner projecting end portion of said inner sleeve member adapted to pass through said opening but preventing sliding of said inner sleeve member through said outer sleeve member in outward direction and adapted to outwardly bend said outwardly bendable stop means at the inner end of said outer sleeve member when said inner sleeve member is pulled in outward direction; stop means arranged on said outer projecting end portion of said inner sleeve member preventing sliding of the same through said outer sleeve member in inward direction; a tubular extension on the outer end of said outer sleeve member shaped so as to form a space between itself and said inner projecting end portion of said inner sleeve member; and spring means arranged within said space abutting at one end against said stop means on said outer projecting end portion of said inner sleeve member, and at its other end against said tubular extension on said outer sleeve member tending to slide said inner sleeve member within said outer sleeve member in inward direction.

5. Attaching device for holding a tubular arrangement within an opening comprising in combination an outer sleeve member closely fitting into said opening; an outwardly bent portion at the outer end of said outer sleeve member preventing sliding of the same through said openings in inward direction; outwardly bendable resilient tongues at the inner end of said outer sleeve member preventing in outwardly bent position sliding of said sleeve member through said opening in outward direction; an inner sleeve member closely fitting into said outer sleeve member and arranged within the same projecting at both ends beyond said outer sleeve member so as to form an inner and an outer projecting end portion of said inner sleeve member adapted to pass through said opening, but preventing sliding of said inner sleeve member through said outer sleeve member in outward direction and adapted to outwardly bend said outwardly bendable resilient tongues at said inner end of said outer sleeve member when said inner sleeve member is pulled in outward direction; an outwardly bent portion arranged on the outer projecting end portion of said inner sleeve member preventing sliding of the same through said outer sleeve member in inward direction; and spring means combined with said sleeve members and tending to slide said inner sleeve member within said outer sleeve member in inward direction.

6. Attaching device for holding a tubular arrangement within an opening comprising in combination an outer sleeve member closely fitting into said opening; an outwardly bent portion at the outer end of said outer sleeve member preventing sliding of the same through said openings in inward direction; outwardly bendable resilient tongues at the inner end of said outer sleeve member preventing in outwardly bent position sliding of said sleeve member through said opening in outward direction; an inner sleeve member closely fitting into said outer sleeve member and arranged within the same projecting at both ends beyond said outer sleeve member so as to form an inner and an outer projecting end portion of said inner sleeve member adapted to pass through said opening, but preventing sliding of said inner sleeve member through said outer sleeve member in outward direction and adapted to outwardly bend said outwardly bendable resilient tongues at said inner end of said outer sleeve member when said inner sleeve member is pulled in outward direction; an outwardly bent portion arranged on the projecting outer end portion of said inner sleeve member preventing sliding of the same through said outer sleeve member in inward direction; a tubular extension on the outer end of said outer sleeve member shaped so as to form a space between itself and said inner projecting end portion of said inner sleeve member; an inwardly bent portion arranged at the outer end of said tubular extension; and a spiral spring arranged within said space abutting at its inner end against said outwardly bent portion arranged on the outer projecting end portion of said inner sleeve member, and at its other end against said inwardly bent portion arranged at the outer end of said tubular extension; said spiral spring tending to slide said inner sleeve member within said outer sleeve member in inward direction.

JOHANNES ANDRIES CHRISTIAAN
MALCHUS.

REFERENCES CITED

The following references are of record in the file of this patent:

FOREIGN PATENTS

| Number | Country | Date |
|---|---|---|
| 52,021 | Netherlands | Feb. 16, 1942 |